Sept. 7, 1943.   C. B. MOORE   2,328,664
MULTIPLE POTENTIOMETER
Filed Aug. 13, 1938   7 Sheets-Sheet 1

INVENTOR.
COLEMAN B. MOORE
BY George M. Musselman
ATTORNEY

Sept. 7, 1943.　　　C. B. MOORE　　　2,328,664
MULTIPLE POTENTIOMETER
Filed Aug. 13, 1938　　　7 Sheets-Sheet 2

INVENTOR.
COLEMAN B. MOORE
BY
ATTORNEY

Sept. 7, 1943.   C. B. MOORE   2,328,664
MULTIPLE POTENTIOMETER
Filed Aug. 13, 1938   7 Sheets-Sheet 4

INVENTOR.
COLEMAN B. MOORE
BY
ATTORNEY

Sept. 7, 1943. C. B. MOORE 2,328,664
MULTIPLE POTENTIOMETER
Filed Aug. 13, 1938 7 Sheets-Sheet 5

INVENTOR.
COLEMAN B. MOORE
BY
ATTORNEY

Sept. 7, 1943.　　　　C. B. MOORE　　　　2,328,664
MULTIPLE POTENTIOMETER
Filed Aug. 13, 1938　　　　7 Sheets-Sheet 6

FIG.16.

INVENTOR.
COLEMAN B. MOORE
BY
ATTORNEY

Sept. 7, 1943.   C. B. MOORE   2,328,664
MULTIPLE POTENTIOMETER
Filed Aug. 13, 1938   7 Sheets-Sheet 7

FIG. 17

INVENTOR.
COLEMAN B. MOORE
BY George M. Muschamp
ATTORNEY

Patented Sept. 7, 1943

2,328,664

UNITED STATES PATENT OFFICE 2,328,664

MULTIPLE POTENTIOMETER

Coleman B. Moore, Carroll Park, Pa., assignor to The Brown Instrument Company, Philadelphia, Pa., a corporation of Pennsylvania Application August 13, 1938, Serial No. 224,826

9 Claims. (Cl. 234—66)

The present invention relates to a recording potentiometer. In most instruments of this type, the value of the temperature at a series of points is measured sequentially, and a mark is made on a properly calibrated chart by a pen of some sort to indicate the various temperatures. Previous to my invention it was customary to use a multiple colored ribbon that was moved to various positions in accordance with the place that was having its temperature measured. A hammer member, moved to a position along the chart according to the temperature, was then brought into contact with the ribbon to press it against the chart to make a mark thereon. This method has the serious objection of limiting the number of records that can be made by a single instrument to the number of colors that it is feasible to place on a single ribbon, usually three or four.

My invention obviates the above limitation to the number of records that can be made by a single potentiometer instrument and permits four or five times as many records per instrument to be made. I use a print wheel that is indexed for each measurement to bring a suitable character into printing relation with the chart, which print wheel is then moved to a position along the chart corresponding to the temperature being measured and pressed thereagainst. If desired, each of the characters can be made different in form and a single colored ink may be used, or, if desired, each character can be printed in a different colored ink.

In recording temperatures with an instrument of this type, there is of necessity an interval of time between the time one record is made and the time the next is made, during which the measuring mechanism is setting the print-wheel at the correct position along the chart. If the difference between the values of the various temperatures is about the same, the interval between the recordings will be about the same, and the instrument can be adjusted to print at equal intervals of time. If, however, the difference between the values of the various temperatures varies greatly and the instrument records at equal periods of time, there will be an unnecessarily large lapse of time between the time that the measuring mechanism comes into balance and the time that the record is made where the difference between the temperature values is small. For records of this type, it is desirable to have a variable time between the printing of one record and the printing of the next, the time depending upon how long it takes the measuring mechanism to reach balance. In the following description I will disclose a printing mechanism that has a fixed time between each of the records and a printing mechanism that has a variable time between each of the records, said variable time depending in each case upon the difference in the value of the two temperatures to be recorded.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
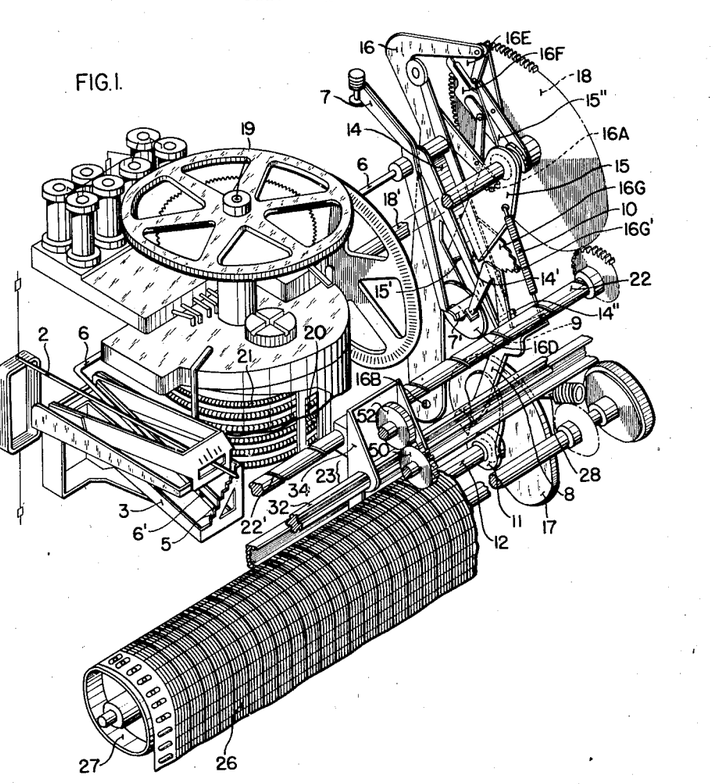
Fig. 1 is a perspective view of a potentiometer.
Figure 2:
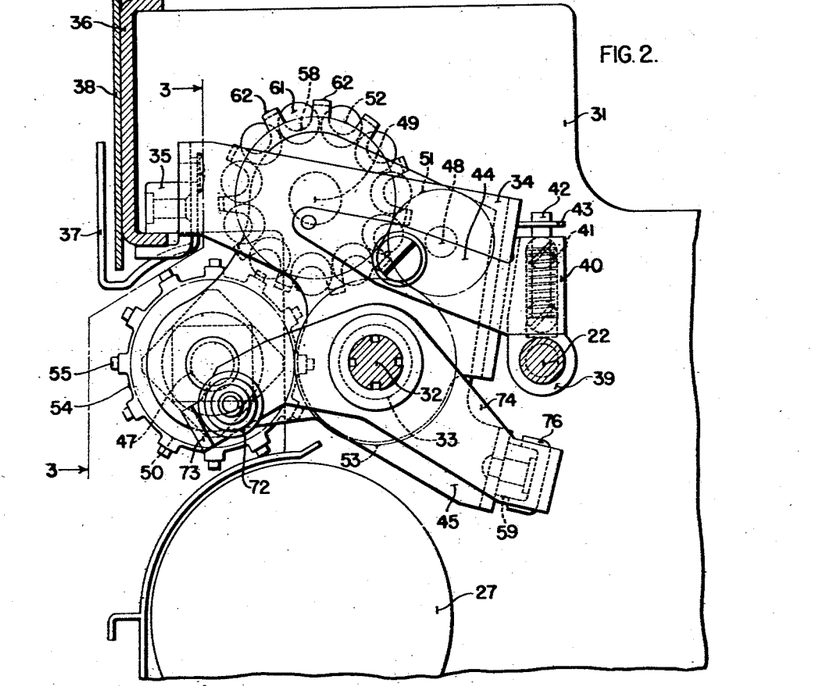
Fig. 2 is a side view of the printing mechanism.
Figure 3:
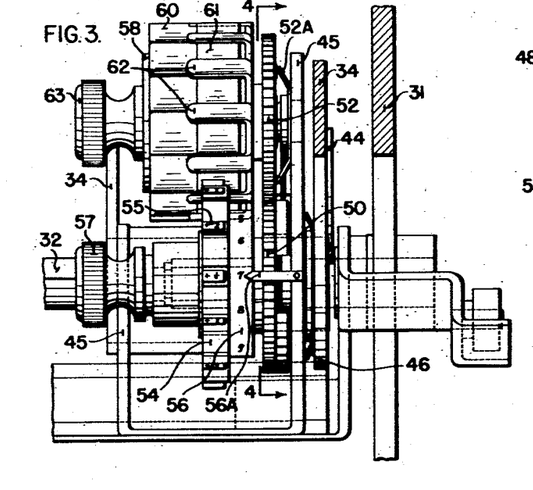
Fig. 3 is a view looking from the left of Fig. 2 on line 3—3.

In the form illustrated in Figs. 1 to 3, the invention is incorporated in a potentiometer recording instrument of the commercial type, known as the "Brown Potentiometer," and of the particular form disclosed in Patent 2,150,502, granted March 14, 1939, on an application filed jointly by Thomas R. Harrison, Ernest H. Grauel and Ernest Kessler. The said instrument comprises a galvonometer, having a pointer 2 which deflects in response to a condition of unbalance in a potentiometer measuring circuit. The instrument also comprises mechanical relay provisions including a constantly rotating power shaft 12, and controlled by the galvanometer pointer 2 deflection from its normal position, for periodically rebalancing the potentiometer circuit, and for moving a recorder carriage 23 along a travelling record strip 26 as required to make a record on said strip of the varying value of the quantity measured.

The mechanism of Fig 1, through which the deflection of the galvanometer pointer 2 controls the adjustments of the recorder carriage 23 and the rebalancing of the potentiometer circuit on a variation in the value of the quantity measured by the galvanometer, comprises a pointer position gauging element 3. The latter is pivotally supported, and in connection with the hereinafter mentioned shaft 6, has a bias which may well be due partly to spring and partly to gravitational action, to turn upward into the position in which one or another of the shoulders 5 of the member 3, engages the pointer 2. The element 3 is engaged by, and turns with the arm 6' of a rock shaft 6. A spring 10, Figs. 1 and 16, tends to hold a rocker 8 which is journalled on a pivot 9, in the position in which the rocker engages the lateral projection 7' of an arm 7 secured to the shaft 6, and thereby holds the latter in a position in which the shoulders 5 are all below the pointer 2.

A cam 11 which is carried by the constantly rotating power shaft 12, turns the rocker 8 about its pivot against the action of the spring 10, once during each revolution of the shaft. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7 thus permitted, will be greater or less, according to the deflective position of the pointer 2 at the time. When the arm 7 thus turns counter-clockwise, its lateral projection 7' engages and turns a secondary pointer element 14 into a position corresponding to the then deflection of the pointer 2. The secondary pointer 14 is loosely journalled on the shaft 6, and has a gravitational bias to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of high, neutral and low steps or shoulders along the edge 15' of a locking member 15, engages the bottom wall of a slot 14' in the member 14 and thereby frictionally holds the latter in the position occupied by it when such engagement occurs. The locking part 15 is given a tendency to move into locking engagement with the secondary pointer 14 by the spring 10, but is periodically held out of such engagement by the action on a lateral projection form the member 15 of a projection 16A carried by a ratchet lever 16 pivoted at 16B.

The lever 16 has a spring bias to turn forward, in the clockwise direction as seen in Fig. 1, but throughout the major portion of each rotation of the shaft 12, the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls is biased for movement into a position in which it does not engage the teeth of the wheel 18, but one or the other of the pawls is brought into engagement with the teeth of the wheel 18, on each forward or clockwise movement of the lever 16, by the locking part 15, if the latter is then at one side or the other of its intermediate or neutral position, occupied when the galvanometer pointer 2 is in its neutral position.

The position assumed by the part 15 when in locking engagement with the secondary pointer 14, controls the action of the pawls 16E and 16F by virtue of the fact that the part 15 carries a pawl engaging spring arm 15''. The movement of the locking part 15 into the position in which its high shoulder of its edge 15' engages the secondary pointer 14, causes the arm 15'' to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its low shoulder of edge 15' engages the secondary pointer 14, the arm 15'' shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14'' of the secondary pointer 14 and thereby arrest the forward movement of the ratchet lever 16, after an extent of forward movement varying with the shoulder engaged. In the neutral position of the galvanometer pointer and secondary pointer 14, the projection 14'' of the latter engages the central shoulder 16G' of the arm 16G and the lever 16 is then held against any operative movement in the clockwise direction. When the secondary pointer position is more or less to one side or the other of its neutral positions, the portion 14'' engages an upper or lower shoulder of arm 16G more or less distant from the central shoulder 16G', and the lever 16 is then permitted more or less forward movement.

The rotation of the wheel 18 in one direction or the other, effects corresponding potentiometer rebalancing adjustments, and corresponding position adjustments of the recorder carrier indicated generally at 23. The rebalancing adjustments are effected by means of a rheostat shaft 19 which is geared to the shaft 18' on which the wheel 18 is secured. The rotation of the shaft 19 moves a bridging contact 20 along the convolutions 21 of a potentiometer slide resistance helically disposed about the axis of the shaft 19, and thereby varies the amount of said resistance in the potentiometer circuit. The resistance adjustments made in response to a deflection of the galvanometer pointer in either direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear carried by a carriage adjusting shaft 22. The latter is formed with a thread groove 22' of coarse pitch, which receives a cam or mutilated screw thread rib (not shown) secured to the carriage 23, so that the latter is moved longitudinally of the shaft 22 as the latter is rotated.

The record sheet 26 passes over and is given feeding or advancing movements by a record feed roll 27. The latter is intermittently rotated by means of a worm and screw connection between the shaft of the roll 27 and a transverse shaft 28, and connection including a ratchet and lever (not shown) between the shafts 28 and 12.

Figure 7:
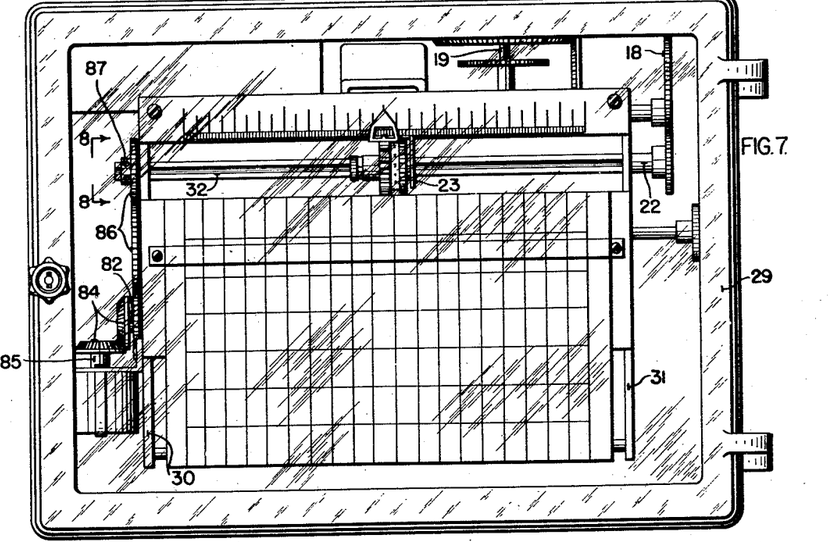
Fig. 7 is a front view of a potentiometer incorporating the printing mechanism of the present invention.

The measuring apparatus just described is mounted in a casing 29 (Fig. 7) and is supported therein by two side plates, 30 and 31, in such a manner that it may be swung out of the casing 29, when the door thereof is opened, for inspection. The carriage adjusting shaft 22 along with a carriage supporting and rotating shaft 32 are journaled for rotation in the side plates and their movements impart the proper indexing and displacement movements to the print wheel mechanism indicated generally at 23.

Figure 4:
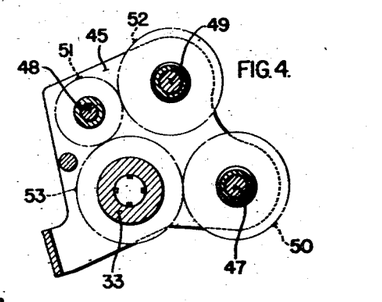
Fig. 4 is a view taken on line 4—4 of Fig. 3.

Referring more particularly to Figures 2 to 4, the details of the printing mechanism will now be described. This printing mechanism consists essentially of three parts, a supporting part for the entire mechanism to keep it correctly positioned, a moving part to shift it longitudinally, and a tilting part upon which the printing and inking wheels are mounted and with which they are moved into engagement with the chart in order to record the values being measured. The supporting part comprises a journal 33 that is slidable along shaft 32 and has teeth thereon to engage the splines on said shaft so that it may be rotated as the shaft is indexed. Mounted on this journal is a generally U-shaped member 34 whose forward end is bent at right angles to the side of the instrument and carries a roller 35 adapted to ride on one edge of a channel member 36 fastened across the front of the instrument between side plates 30 and 31. Attached to the inturned end, and extending below and then up in front of the channel member 36, is a pointer 37 that cooperates with a scale 38 attached to the channel member to indicate the position of the carriage and, therefore, the temperature of the condition being measured.

The moving part of the print mechanism consists of a journal 39 formed with a tooth therein that surrounds shaft 22. The tooth enters the helical thread 22' on the shaft so that any rotation of the shaft will move the journal therealong. Formed integral with an extending above journal 39 is a tubular member 40 in the bore of which is inserted a spring 41 and a pin 42, having an enlarged head on its lower end. The spring forces the head of pin 42 into frictional engagement with shaft 22 and serves to prevent overtravel of the pen carriage. A washer 43 is provided on the upper end of pin 42 to limit its downward movement. Formed on the side of the tubular member is an arm 44 that is attached by a screw, or other means, to the side of member 34. The effect is that rotation of shaft 22 will move journal 39 therealong, and by means of arm 44, the member 34 will be moved the same amount.

The tilting part comprises a member 45 having its lower end bent to U-shape to provide two bearings for it on journal 33, around which it moves, inside of the arms of member 34 as shown in Fig. 3. A spring washer 46 is inserted between the right-hand sides of members 34 and 45 to prevent lateral play therebetween, so that as member 34 is shifted, as above described, member 45 will retain a definite relation thereto. The cross-part of member 45 has a roller 59 attached to it that extends into the groove of a channel member 76 for a purpose to be later described. The washer 46 permits, however, relative turning movement between parts 34 and 45. Extending from the inner face of member 45 are three stud shafts 47, 48 and 49 that have mounted for rotation on them, respectively, gears 50, 51 and 52. Gears 50 and 51 mesh with and are driven by a gear 53 that is rigidly attached to the journal 33, while gear 52 is driven by gear 51 to rotate in a direction opposite to gear 50. Gear 50 has a journal formed therewith upon which is mounted a print wheel 54 that has raised portions 55 on the surface thereof formed in the shape of the characters it is desired to print. The print wheel also has to the right of its portions 55 a collar 56 upon which are printed characters corresponding to those at 55, but offset thereto in such a manner that when the character to be printed is at the bottom of the wheel, a similar character will appear at the front of the wheel on collar 56 and opposite pointer 56A. This print wheel is held in place on its journal by a thumb knob 57.

A journal is also formed on gear 52, and mounted upon it is an ink pad supporting member 58 whose surface is formed with a series of circular grooves in which are placed ink pads. These ink pads each consist of a cup-shaped member 60 in which is inserted, in protruding relation, a piece of felt 61 that has been saturated with the desired colored ink. Fingers 62 extend from the side of member 58 and over the ink pads to hold them in place on the wheel, and the entire assembly is held on its journal by a thumb screw 63.

As many characters 55 and ink pads 61 are provided as there are records to be printed in accordance with the measurement to be made by the instrument. When a new measurement is to be taken, the shaft 32 is indexed in a manner to be described, and this in turn rotates gears 50, 51 and 52 to bring a character 55 into printing position over the chart 26. As this occurs, another character is brought into engagement with its ink pad to place a supply of ink thereon. A spring washer 52A is placed between gear 52 and member 45 to act to retard movement of that gear and prevent any possibility of overtravel. The manner of indexing shaft 32 and of making an impression on the chart will now be described.

Figure 5:
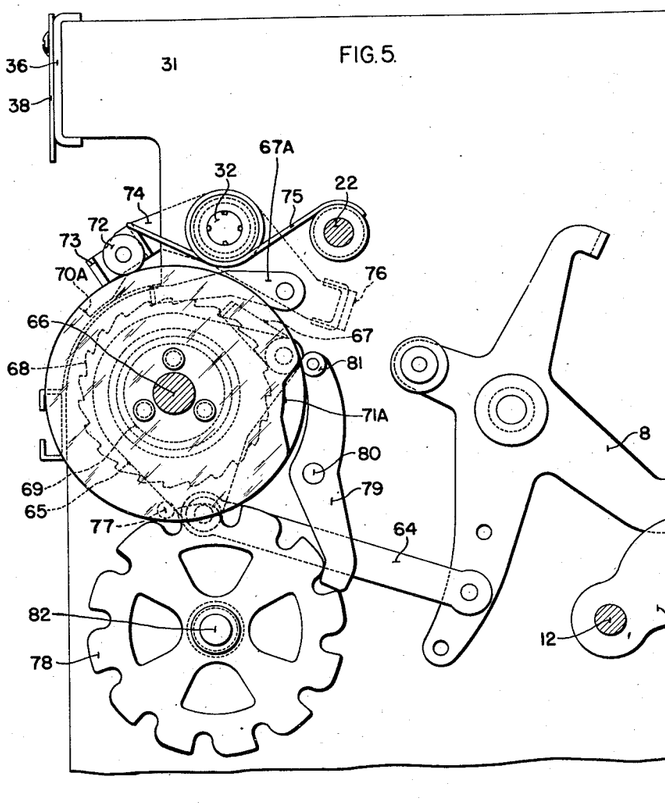
Fig. 5 is a side view of the actuating mechanism for my printing mechanism.
Figure 6:
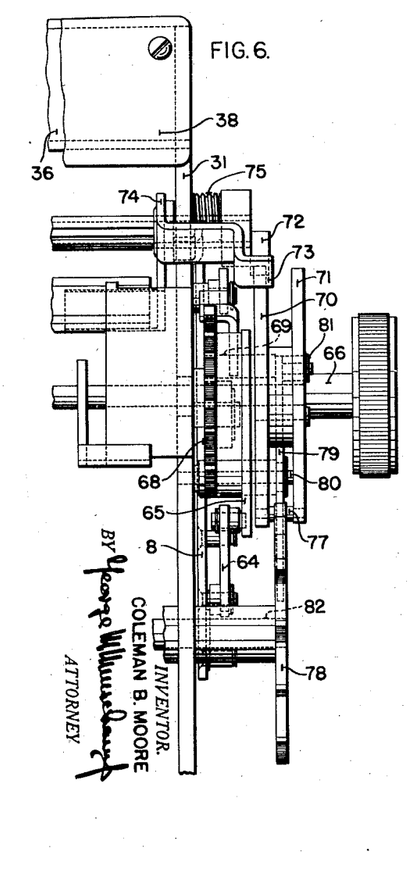
Fig. 6 is a view looking from the left of Fig. 5.

When a new measurement is to be made by the instrument, the galvanometer is switched into circuit with a thermocouple that is located at the point where the measurement is to be taken. Since the value of the new measurement may differ considerably from the one previously made, it may be necessary for the instrument to make several cycles before the galvanometer is brought into balance, and the shaft 22 is rotated enough to place a character 55 at the correct position over the chart 26. Because of this fact, a predetermined number of cycles is made between each indexing and printing operation. To this end, lever 8, which is oscillated once by cam 11 for each cycle of the instrument, has a link 64 pivoted thereto, the other end of which is attached to a plate 65 that is mounted to oscillate on a journal 69, which in turn moves around shaft 66 that extends between side plates 31 and 32 to support the chart roller 27. Oscillation of plate 65 around shaft 66 rotates, by means of a pawl 67 attached to the plate, a ratchet wheel 68 that has a journal 69 thereon surrounding shaft 66. A second pawl 67A prevents retrograde movement of ratchet 68. The ratchet 68 and journal 69, therefore, make one complete rotation for a predetermined number of cycles of the instrument, which number of cycles can be altered by moving the right end of link 64 nearer to or farther from the axis of lever 8.

A pair of cams 70 and 71 are fastened together and attached to journal 69 for rotation therewith. The cam 70 serves to determine the printing movements of the characters 55, while cam 71 serves to lock the indexing mechanism in place. A pin extending between the two cams actuates the indexing mechanism. Bearing on the surface of cam 70 is a roller 72 that is mounted on an off-set end of a lever 74, which oscillates around the splined shaft 32 and is biased in a counter-clockwise direction by a spring 75. The rear end of lever 74 is attached to a channel member 76, to the other end of which is attached a lever (not shown) also oscillatable around shaft 32 and similar to the back half of lever 74. As the cut-out portion 70A of cam 70 comes under an edge 73 of lever 74, this lever turns counter-clockwise under the bias of spring 75 to move the channel member 76 upwardly. Since roller 59 on member 45, carrying the print wheel 54 and ink pad wheel 58, is in the channel of member 76, this roller 59 will be lifted upwardly, and member 45 will be pivoted around the journal 33 to move a character 55 into contact with the chart to make an impression thereon. It will be seen that the leading edge of cut-out portion 70A is abrupt, so that when it comes under edge 73, that edge will move down very quickly to make a sharp impression on the chart, while the following edge of the cut-out portion 70A will act on roller 72 to move lever 74 clockwise to lower channel member 76 and raise the character 55 from the chart.

Immediately after the printing has taken place, the instrument is indexed to place another measuring element, such as a thermocouple, in the galvanometer circuit. The indexing is accomplished by a pin 77 that extends between the two cams 70 and 71 and is attached thereto. Once during each revolution of the cams, the pin 77 engages a tooth on the periphery of toothed wheel 78 and rotates it the distance of one tooth. Normally this wheel 78 is locked in position by a lever 79, pivoted at 80 and having a finger on its lower end engaging the toothed wheel while a roller 81 on its upper end bears on the surface of cam 71. The cycle of the instrument after the printing brings a cut-out portion 71A of cam 71 under the roller 81. At the same time, pin 77 engages a tooth on wheel 78 to rotate it; thus lever 79 is moved counter-clockwise with roller 81 moving into the cut-out portion 71A. The next cycle of the instrument again brings the high portion of cam 71 under roller 81 and thereby moves the finger on the lower end of lever 79 into the space between two teeth of wheel 78 to lock it in place.

Figure 8:
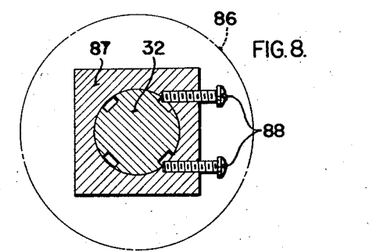
Fig. 8 is a view taken on line 8—8 of Fig. 7.

Shaft 82, upon which the wheel 78 is mounted, extends through both side plates 31 and 30, and when it is rotated, through gearing 84, rotates a shaft 85 in a switch (which may be of the type shown in Harrison Patent 1,770,918) to connect another thermocouple in circuit with the galvanometer. Rotation of this shaft also, through gearing 86, rotates the splined shaft 32 to move another character 55 into printing position, ready for the next impression to be made on chart 26, as cut-out portion 70A of cam 70 comes under edge 73. The upper gear of the gearing 86 which extends over splined shaft 32 has a square hub 87 (Fig. 8) through which are threaded two set screws 88. By adjusting these screws relative to the hub 87, shaft 32 can be rotated a slight amount to insure an accurate setting of the characters 55 in their printing position in order to get a clear-cut impression.

The operation of the device should be apparent from the above-detailed description, but a short résumé will now be given. Starting with the parts in the positions they assume after an indexing operation has been performed, the subsequent cycles of the instrument will balance the galvanometer and thereby rotate shaft 22 to shift the printing mechanism to its proper position above the chart. The balancing operations will also rotate cams 70 and 71 through the pawl and ratchet mechanism 67, 68 by movement of the lever 8. When the cut-out portion 70A of cam 70 moves under edge 73, the channel member 76 will be lifted under the bias of spring 75 to move a character 55 into engagement with the chart. The same cycle of the instrument that permits printing will also move the following edge of cut-out portion 70A under roller 72 to lift the character 55 from the chart, thus making a clear-cut impression. The next cycle of the instrument will bring the portion 71A of cam 71 under roller 80 so that pin 77 can move toothed wheel 78. As this wheel rotates, its shaft 82 will adjust the shaft 85 to connect the instrument to another thermocouple and will also rotate shaft 32 to bring another character 55 into printing position.

As shown in Fig. 5 of the drawings wheel 78 has twelve teeth, and there is one pin 77 in between the cams 70 and 71. Therefore, the wheel 78 is moved one-twelfth of a revolution of each indexing movement. With this arrangement, a thermocouple switch for twelve thermocouples is used, and a print wheel with twelve characters is used, so that the instrument can make twelve different records. It will be obvious that by varying the number of teeth on wheel 78 and the number of pins 77 between the cams 70 and 71, that the wheel 78 can be rotated in almost any desired number of steps. If a different thermocouple is connected to the instrument for each of the steps, as above described, the instrument can be used to consecutively measure and record the value of the temperatures to which each of these thermocouples is subjected. It is, of course, necessary that a print wheel be supplied having the same number of printing characters that there are thermocouples.

As shown in Fig. 3, each of the characters 55 on the print wheel 54 consists of a numeral to indicate the number of the record being made with a plus mark in front of it. This plus mark serves a very definite function, inasmuch as the balancing mechanism of the instrument is designed to move the print wheel to a position where the vertical line of the plus mark is exactly over the corresponding temperature line on the chart. As the printing is done, the horizontal line of the plus mark is exactly over the time line on the chart. Thus the numeral indicates the number of the record being made, and the point at which the vertical and horizontal lines of the plus mark fall indicates the exact temperature of the condition being measured and the exact time that it was made. Any similar characters performing the same function may be used, or, if desired, the numerals could be omitted and different colored inks used to indicate the different records.

The modification of the invention disclosed in Figures 9–12 differs from that already described in several features of construction, including the manner of indexing the mechanism and the manner in which an impression is made on a chart. The same reference numerals will be used for duplicate parts in the description of this modification. In this modification, an extension of shaft 12 has a pinion 90 on its end which meshes with a large gear 91 mounted for rotation on a stud shaft 92. The gear 91 has a hub extension 93 which is, for example, hexagonal in shape and has slidably mounted on it a journal carrying a gear 94. A spring clip 95 surrounds the journal of gear 94 and resiliently presses a ball into one of a series of grooves on the hub 93 of the gear 91. In this manner, gear 94 can be adjusted axially of hub 93 by means of disc 96 to bring the gear 94 into mesh with any one of gears 97, 98 or 99 that are mounted on stud shafts and are spaced various distances from the side plate 31 as shown best in Fig. 11. Each of the gears 97, 98 and 99 is at all times in mesh with gears 100, 101 and 102, respectively, that are of different diameters and are attached to a hub 103 mounted for rotation on a stud shaft 104 extending from side plate 31. The effect is that the hub 103 will be driven from main drive shaft 12 at varying speeds, depending upon which of the gears 97, 98 or 99 the gear 94 is in mesh with.

Figure 9:
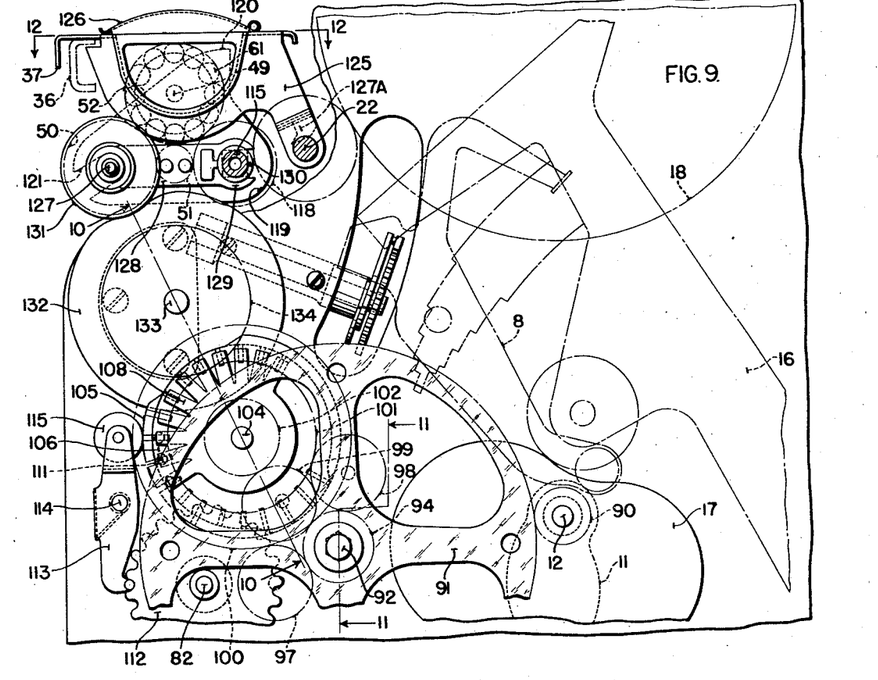
Fig. 9 is a side view of a modified form of printing mechanism showing the actuating mechanism therefor.
Figure 10:
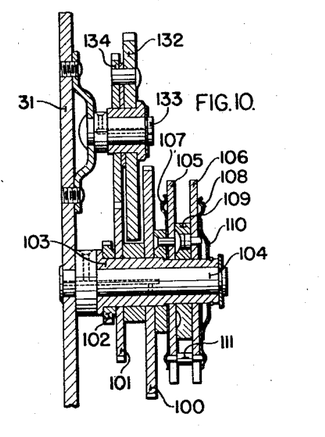
Fig. 10 is a view taken on line 10—10 of Fig. 9.
Figure 11:
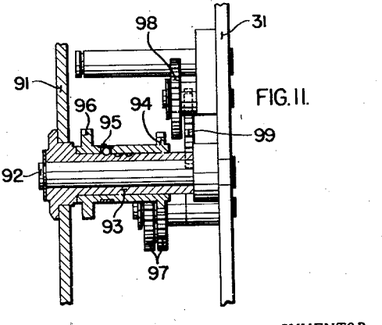
Fig. 11 is a view taken on line 11—11 of Fig. 9.
Figure 12:
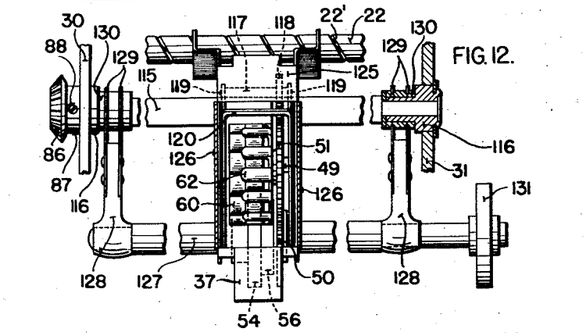
Fig. 12 is a view taken on line 12—12 of Fig. 9.

Also mounted on hub 103 are two control discs 105 and 106 that each have a periphery of two radii and that have retaining members 107 and 108, respectively, attached thereto. Spacer member 109 is attached to disc 106 and is shaped to receive a spanner wrench so that the disc 106 and member 108 can be rotated relative to disc 105 and member 107 for a purpose to be described. The end of hub 103 has a spring washer 110 on it to press the discs 105 and 106 together and thereby prevent any accidental relative movement of the two. Each of the discs 105 and 106 has a series of notches extending radially from its circumference, and each of the retaining members has its circumference formed as a series of fingers over-lying the notches, as is best shown in Fig. 9. By moving the discs relative to each other, a variable number of the notches in each disc can be made to line up with each other, and a cam with a variable arc of low portion is formed by the two discs when taken together. Pins 111 are then inserted in the aligned notches of the discs 105 and 106, to form in effect gear teeth, and are held in place by the fingers on retaining members 107 and 108. By relatively moving discs 105 and 106 and inserting the pins 111, there is obtained a mutilated gear having a predetermined number of teeth with respect to the length of the arc of the low portion of the cam. As shown in Fig. 9, there are three pins 111 forming a gear with three teeth, and the low portion of the cam is approximately 45°.

Rotation of the above-described mutilated gear wheel is used to index the printing mechanism and to move the shaft 85 of the thermocouple switch to connect another thermocouple in circuit with the galvanometer. This is accomplished by having a toothed wheel 112, of different shape from wheel 78, mounted on shaft 82 to be rotated by pins 111 of the above-described mechanism. This toothed wheel is also locked in place, as was wheel 78, except during the time that an indexing operation is taking place. The locking is accomplished by a lever 113 that is pivoted at 114 and has a wide roller 115 on its upper end bearing on the periphery of discs 105 and 106 and a finger on its lower end extending between two teeth of wheel 112. The discs 105 and 106 are being rotated at a constant speed from main shaft 12 of the instrument to periodically bring pins 111 into mesh with wheel 112 and perform an indexing operation. The frequency of this operation depends upon which of the gears 97, 98, or 99 the gear 94 is in mesh with, and the amount of rotation of shaft 82 depends upon the number of pins 111 that is being used.

Rotation of shaft 82 in this modification, as in that of Fig. 1, rotates a shaft that brings different characters into printing relation with the chart. In this case, instead of using a splined shaft, there is mounted in the side plates a square shaft 115 that has its ends reduced and journaled in bearing members 116 which rotate therewith. Slidably journaled on shaft 115 is the supporting mechanism for the print carriage that is now to be described.

The supporting part of this modification of the print wheel mechanism comprises a journal 117 having a square opening therethrough that is slidable on shaft 115 and has a circular exterior. Attached to this journal is a gear 118, and rotatably mounted on its ends are backwardly extending wings 119 of a generally U-shaped supporting member 120 whose front ends are formed with notches 121. Rotatably mounted in the member 120 is a small idler pinion 51 and a shaft 49 upon which is fastened a gear 52, the pinion and gear meshing with and driven by gear 118 as the square shaft 115 is rotated. A wheel for supporting ink pads similar to those shown in Figs. 2 and 3 is placed on shaft 49 to rotate therewith.

The moving part of the printing mechanism consists of a U-shaped member 125 whose rearwardly extending ends surround the shaft 22 and whose front ends form, with pointer 37, a guide that is received by the channel member 36. The sides of this member 125 lie close to and outside of the sides of supporting member 120, so that as member 125 is shifted along shaft 22, the member 120 will be carried therewith to be properly positioned over the chart in accordance with the value being measured. The member 125 is provided with a cap 126 to cover and protect the inking mechanism, and is shifted upon rotation of shaft 22 by a spring 127A formed thereon, extending into groove 22' of the shaft 22.

The print wheel 54 and gear 50 which rotates it are slidably and rotatably mounted on a shaft 127, that is in turn mounted to rotate around the square shaft 115. Attached to each end of shaft 127 is an arm 128 having two spring finger extensions 129 that are received in grooves of bushings 130 which surround the bearing members 116. The print wheel and its gear are received between the sides of member 120, and shaft 127 is received in slots 121 of said member. In this manner, the frame formed by shaft 127 and its arms 128 may be raised and lowered around its shaft 115 to raise and lower the print wheel and frame 120 which carries the ink pads 61. A means to raise and lower the shaft in order to move a character 55 against the chart 26 consists of a roller 131, on an extension of shaft 127. This roller bears on a cam 132 which is rotatable on a stud shaft 133 attached to the side plate 31. Rotation is imparted to the cam 132 in synchronism with the indexing mechanism by a gear 134 attached thereto, that is in mesh with the continuously rotating gear 101 on the bushing 103 carrying the above-mentioned mutilated gear.

In the operation of this modification, the gear 94 is first meshed with one of the gears 97, 98 or 99 to determine the speed at which the discs 105 and 106 and gear 101 are to rotate, and, therefore, the time between each impression and each indexing operation. Next the discs 105 and 106 are rotated relative to each other so that the proper number of pins 111 may be inserted in the slots thereof. When this has been done, the instrument is started, and periodically the low portion of cam 132 will come under roller 131 to lower the print wheel 54 and thereby make an impression on the chart. Immediately after this, the low portion of the cam formed by discs 105 and 106 will come under roller 115 of the locking member 113 so that its lower end may be moved away from wheel 112, and pins 111 engage the teeth thereof to rotate shaft 82. This rotates shaft 85 to connect another thermocouple in circuit with the galvanometer and also, through gearing 86, rotates shaft 115 to bring another character 55 on the print wheel 54 into printing position. A predetermined time thereafter, the low portion of cam 132 again comes under roller 131 to cause an impression to be made on the chart, and a new cycle is started.

If, for example, sixteen records are to be made, a thermocouple switch with enough terminals for that many thermocouples will be provided, and a print wheel with sixteen characters will be provided. Then enough pins 111 will be inserted between discs 105 and 106 to turn the wheel 112 one-sixteenth of a revolution upon the occurrence of each indexing movement. By inserting twice as many pins 111 in the discs, the wheel 112 will make one-eighth of a revolution each time, and eight records will be obtained. A new print wheel with only eight characters will be placed on shaft 127 in such a case. In this modification, the print wheel is changed by moving shaft 127 laterally away from shaft 115 to release the spring fingers 129 from bushings 130. The slots 121 in member 120 permit this to be done and also properly locate the shaft 127 upon replacement. To remove the print wheel 54 from shaft 127, the left-hand arm 128 is first removed, and the print wheel is then slipped off the end of the shaft.

Figure 13:
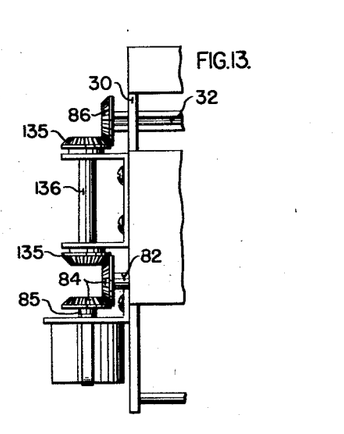
Fig. 13 is a view of a modified form of drive for the indexing mechanism.

In Fig. 13, there is shown a modified form of drive from shaft 82 to shaft 32 or 115. There is disclosed here the use of bevel gears 135 and shaft 136 upon which they are mounted, instead of the spur gearing 86 of Fig. 7. These gears can be interchangeable, and it is a matter of preference which is used.

Figure 14:
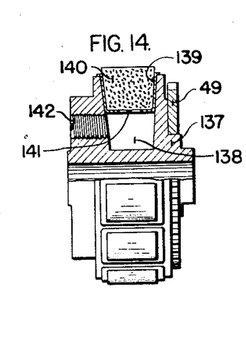
Figs. 14 and 15 are views of a modified form of ink pad.
Figure 15:
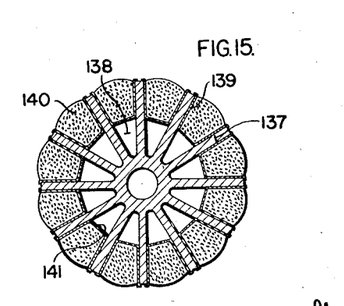

In Figures 14 and 15, there is shown an alternative form of ink wheel. Instead of using the interchangeable cup 60 and felt 61, this ink wheel 137 is provided with a series of angular cups 138 into which are tightly fitted holders 139 for felt ink pads 140. Each of the holders is provided with a slot 141 in its bottom for communication between the ink reservoir at the bottom of cup 138 and the felt pad 140. In order to replenish the ink supply of this type, the ink wheel is removed and turned on its side, after which a screw plug 142 is removed to give access to the reservoir. The ink can best be inserted by the use of a dropper.

Each of the above-described embodiments of the invention is designed to have a predetermined number of cycles of the instrument occur between each printing operation. Thus, the time interval between printing or recording operations is fixed regardless of the length of time required for balance of the instrument to its new value following a change from one thermocouple to another. For example, if the time allotment for each recording operation is sufficiently large to permit the instrument to balance at a new value after balancing for a value widely separated from the new value, the time allotment may be objectionably large for balancing to a value not widely different from the preceding value. Ordinarily it is desirable to record value after value as rapidly as the balancing operations will permit. If, on the other hand, the time allotment to each record is fixed and is small, the instrument may not have time to balance to the new value before the record is made. It follows therefore that for service in which the values are not widely separated, the fixed time cycle of printing is permissible, but for service in which some of the values are widely separated and others are close together, the time allotment is desirably only that required for balance. Such an arrangement will now be described, the same reference numerals being used for the same parts. It is to be understood in the following description that the printing mechanism may be either of the type disclosed in Figs. 2-4, or the type of Fig. 9. The printing per se is the same, but the manner of rotating the cams 70 and 71 which control the printing and indexing operations differs from that of the previous embodiments.

The manner of obtaining the variable time between operations is by controlling the rotation of the cams 70 and 71 in accordance with the position of lever 16, which lever moves variable and smaller amounts as the measuring mechanism nears a balanced condition. The counterclockwise movement of lever 16 (Fig. 16), and therefore the adjustment of shaft 22 and contact 20, is regulated by which of the steps on arm 16G engages projection 14" on secondary pointer 14. As the galvanometer approaches balance during the cycles of the instrument, the projection 14" will be positioned nearer and nearer to a position in which it will lie in the path of step 16G', and at that time the instrument is in balance and the carriage 23 is properly positioned to print.

Figure 16:
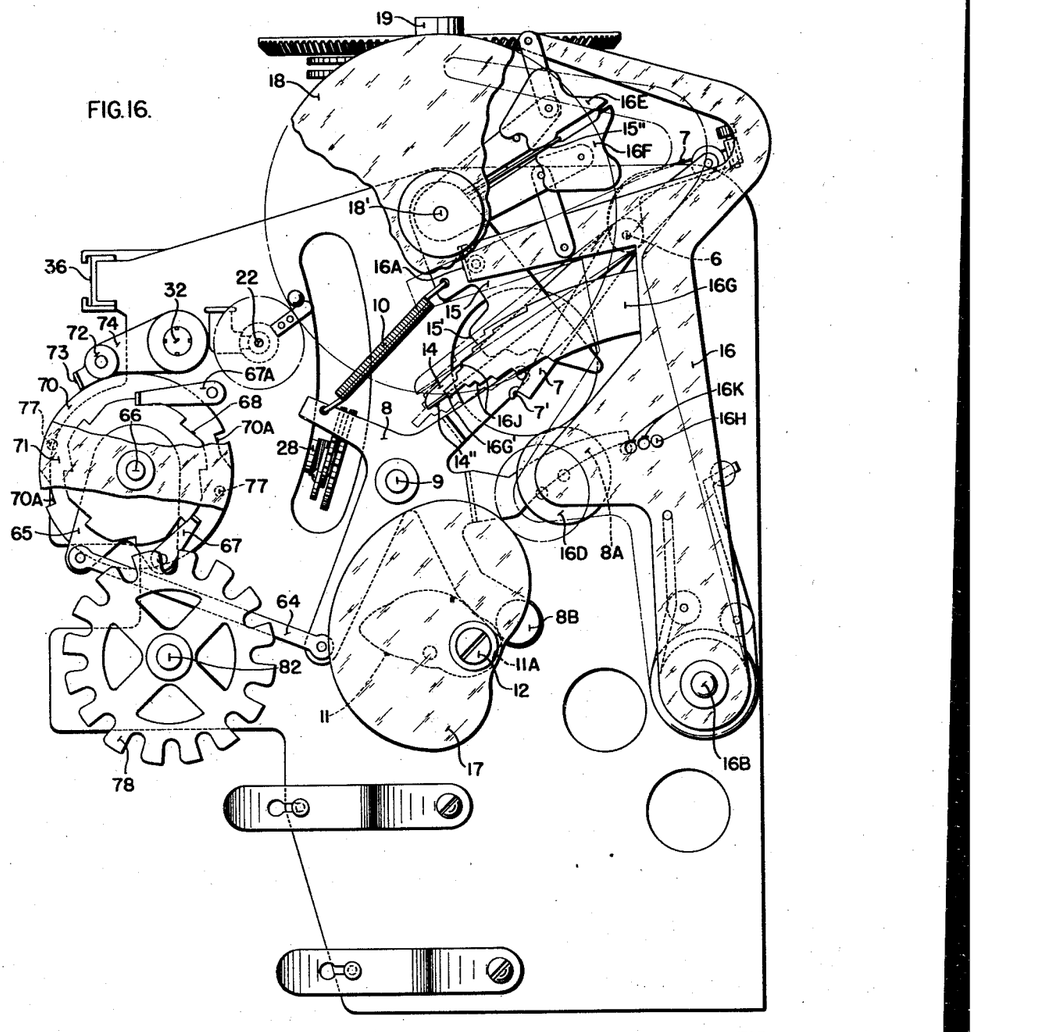
Fig. 16 is a view of a printing mechanism control that has a variable time between each record.

In order to utilize the movement of lever 16 to regulate the printing, the lever 8 is provided with an arm 8A whose lower surface is formed as an arc which is concentric with shaft 16B when the roller 8B rests on that portion of cam 11, as is shown in Fig. 16. The arm 8A is adapted to engage and be stopped by a pin 16H, extending back of lever 16, during each cycle that the projection 14" is far enough from its balanced position to engage any step beyond either of the steps 16J on the arm 16G as is shown by the dotted line position. The engagement between arm 8A and pin 16H limits the clockwise movement of lever 8. When, however, the mechanism is near enough balanced so that projection 14" is engaged by one of the steps 16J, the pin 16H will be beyond the end of arm 8A, and lever 8 can move further clockwise. Sometime within the next four cycles of the instrument after projection 14" has been engaged by step 16J, the instrument will be in balance, and the step 16G' will engage the projection 14" and it will be safe to print.

The ratchet wheel 68 in this embodiment of the invention is made with only eight teeth, instead of a larger number as previously described, and each stroke of lever 8 is sufficient to move it only the distance of one tooth. During the time that pin 16H is in the path of arm 8A, the link 64 and plate 65 can move the pawl 67 through an arc that is slightly smaller than the distance between two teeth on ratchet 68. But when projection 14" is engaged by step 16J, the lever 16 is stopped with pin 16H out of the path of arm 8A, and continued rotation of cam 11, formed in this case with a cut-out portion 11A, will bring the portion 11A under roller 8B and permit lever 8 to rotate clockwise far enough for pawl 67 to engage the next tooth on ratchet 68. Counterclockwise movement of lever 8 will then cause pawl 67 to rotate wheel 68 the distance of one tooth. Such rotation of the wheel 68 continues until the instrument is in balance, and the printing and indexing operations have taken place.

The cam 70 is in this case formed with two cut-out portions, and the cams 70 and 71 are provided with two pins 77. This arrangement causes a printing operation to take place twice during a revolution of cam 70 and once every four cycles of the instrument after it has come near enough in balance for arm 8A to miss pin 16H. The indexing operation takes place in a manner described above just after the printing has occurred. Although, for the sake of clearness, it has not been shown on this figure, it is obvious that a locking arm similar to arm 79 may be used to prevent accidental movement of the wheel 78.

From the above description, it will be apparent that four cycles of the instrument after it has come near enough in balance for projection 14" to be in the path of one of the steps 16J of arm 16G, a printing operation will take place. Since the instrument is designed so that it will come into balance by the time this fourth cycle occurs, it is possible to print just as the galvanometer pointer reaches its null position. Immediately thereafter the instrument is connected to another thermocouple, and a new measurement is made. If the value of the new measurement is near the value of the one just made, it is possible that the instrument will print again after four cycles. If, however, the new measurement has a value of substantial difference from the previous one, it will take a longer time for the instrument to reach a balanced position, but the printing will occur as soon as the instrument comes into balance. Thus, there is no time lost between making records of the values of the temperature to which the various thermocouples are subjected.

Although, as shown, four cycles are required for the printing operation to take place after the projection 14" has engaged step 16J, it will be apparent that other arrangements may be made without departing from the spirit of the invention. For example, if the arm 8A is lengthened, or the pin 16H moved to the left, the operation of ratchet 68 may be made dependent upon the attainment of a condition closer to balance, or, if desired, upon complete balance. To this end, additional holes 16K are provided in lever 16 into which the pin 16H may be inserted if it is desired to wait until the instrument is nearer balance before the printing operation is initiated. In such a case, the projection 14" would engage either the step between step 16J and 16G', or the step 16G' before movement of ratchet 68 is initiated.

By making the circuit changing and printing operations effective upon movement of ratchet 68 for a distance of only one, two, or three teeth, the effect of speeding up the printing may be attained. Under some conditions, the arrangement by which ratchet 68 is operated from a single mechanical balance operation (following any contact of 16G' with 14"), and the printing and circuit changing is performed from a single movement of ratchet 68, is undesirable, especially in an industrial plant where the instrument is subjected to vibration, and accidental mechanical balance may occur without true electrical balance of the system. In a form of the invention described hereinafter with reference to Fig. 17, a single balance stroke arrangement is shown.

If the value of the temperature of one of the thermocouples is higher or lower than the range for which the chart was designed, the instrument will move the print wheel carriage to one end of its travel. Thereafter, the pawls 16E or 16F will be unable to turn gear 18 as they engage it, so the lever 16 cannot move from its extreme clockwise direction as determined by cam 17. Therefore, pin 16H will be out of the path of arm 8A, and printing will occur in the usual manner. Such an arrangement will permit the instrument to then continue to record the value of the other thermocouples, irrespective of whether one or more of them is momentarily too high or too low for its true record to be made on the chart. The appearance of one of the record marks on an edge of the chart is an indication to the operator that its value is incorrect, and the condition of which it is a record should be rectified.

Figure 17:
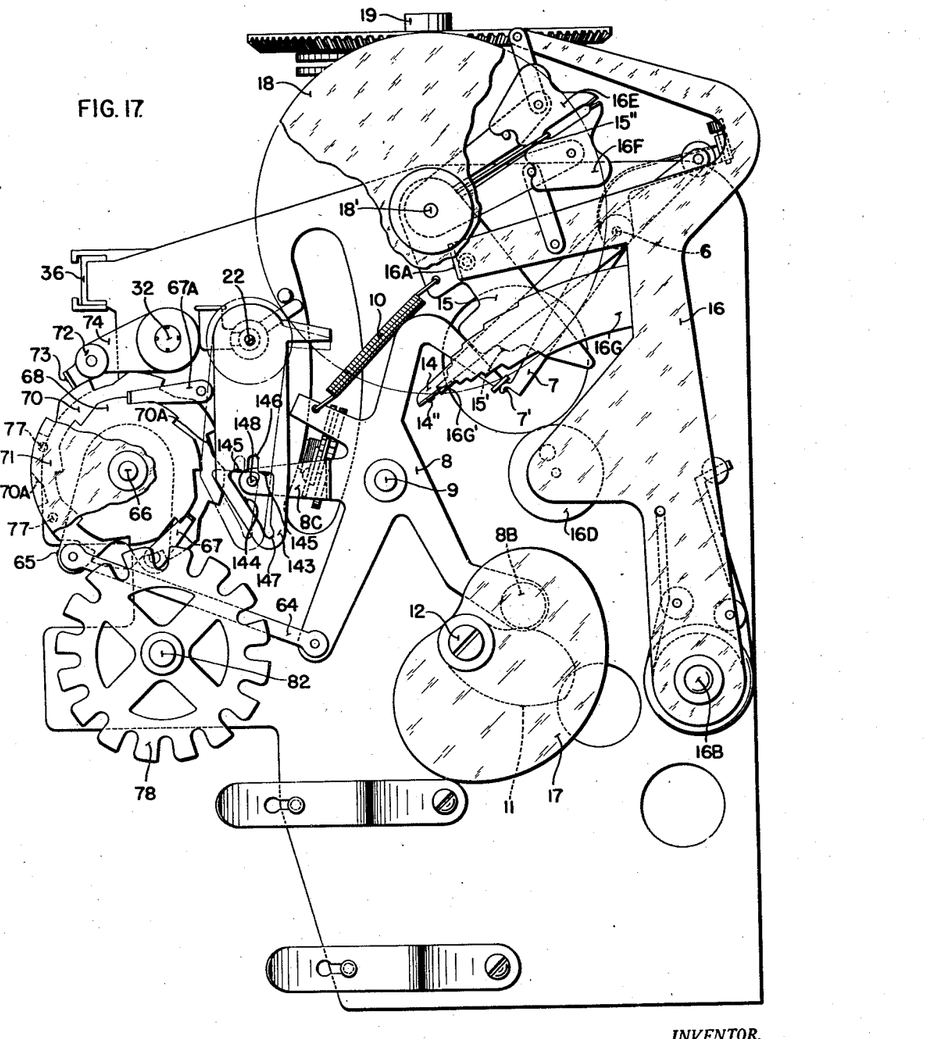
Fig. 17 is a view of another embodiment of a variable time printing mechanism control.

There is disclosed in Fig. 17 another embodiment of the invention in which printing occurs at irregular intervals, depending upon the time it takes the measuring mechanism to become balanced. This embodiment differs from that of Fig. 16 in that the printing and indexing operations take place during the cycle immediately following that in which the instrument reaches a state of balance, and the operations are directly related to the rotation of the helically threaded shaft 22 upon which the printing carriage 23 is mounted.

As has been stated above, the pawls 16E and 16F rotate gear 18 and, by means of another smaller gear on it, shaft 22 an amount proportional to the deviation of the galvanometer pointer 2 from its null position. Each cycle of the instrument, the shaft 22 is therefore rotated some amount until the instrument is in balance, and the shaft remains in its then position with the characters 55 above the correct point along the chart.

In order to utilize the shaft 22 to control the printing, a member 143 having a generally triangularly shaped opening 144 in its lower end is frictionally mounted upon one end of the shaft. The opening 144 in member 143 is provided along its upper end with two shoulders 145 separated by a notch 146 and at its lower end with a second notch 147. Extending into the opening is a pin 148 on an arm 8C formed on the oscillating lever 8. As lever 8 is rotated in a counterclockwise direction by cam 11, the pin 148 will move into notch 147 and position the member 143 in a definite relation thereto. Thereafter as lever 8 moves clockwise, the pin 148 will rise in the opening and engage either one of the shoulders 145 or the notch 146, depending upon whether the shaft 22 has rotated any during the up-stroke of pin 148. If the instrument was not in balance, the shaft 22 will have been rotated, and because of its frictional fit thereon, the member 143 will have moved from the position it took when pin 148 was in notch 147 to its dotted line position if shaft 22 was rotated clockwise. If such is the case, pin 148 will engage one of the shoulders 145; if, however, the instrument was in balance, the member 143 will not have moved, and pin 148 will enter notch 146, thus allowing lever 8 to take its full clockwise stroke.

During the time that lever 8 is oscillating when the instrument is not in balance, the link 64 and pawl plate 65 oscillate through an arc that moves pawl 67 a distance slightly less than the distance between two teeth of the rachet 68, and that ratchet and the cam 70 attached thereto are not rotated. The cycle after the instrument reaches balance, however, there will be no movement of the shaft 22 and member 143, so upon its up-stroke pin 148 will enter notch 146 and thus permit lever 8 and plate 65 to move clockwise enough for pawl 67 to engage the next tooth on ratchet 68. On its counter-clockwise movement, the pawl will then move the ratchet for a distance of one tooth, which, in this case, is one-eighth of a revolution.

It will be noted that in this embodiment of the invention, the cam 70 is formed with eight cut-out portions 70A, and there are eight pins 77 between the cams 70 and 71. Therefore, each time the ratchet 68 and cam 70 are moved, a printing and indexing operation will take place.

Although it is not shown in this embodiment of the invention, it is obvious that a locking pawl of the type shown at 79 in Fig. 5 may be used to prevent accidental turning of the indexing wheel 78.

From the above description, it will be seen that I have devised a recording mechanism for a multiple potentiometer that can be actuated in various ways, thus making such an instrument versatile enough for various types of installations.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a recording mechanism having a chart adapted to receive record marks, a print wheel having printing characters thereon, means to bring one of said characters into engagement with said chart, an intermittently rotated cam controlling said means, a ratchet connected to said cam, a pawl to rotate said ratchet, an oscillating lever, drive means between said lever and pawl, means to oscillate said lever whereby said cam will be rotated to permit a printing operation to take place and means to vary the connection between said lever and oscillating means to change the speed of rotation of said cam.

2. In a measuring instrument the combination of a print wheel, means to rotate said print wheel comprising a shaft, drive means between said shaft and print wheel and drive means for said shaft comprising a toothed wheel, locking means therefor, a rotatable member having a pin thereon adapted to successively engage the teeth of the toothed wheel to rotate the same toothed wheel, a cam moving with said member adapted to control the locking means, rotating means for said member, and means to vary the time required for each rotation of said member by said rotating means.

3. In a measuring instrument the combination of a chart support, a print wheel adapted to be periodically brought into engagement with a chart on said support and then rotated a portion of a turn, means to move said print wheel into engagement with a chart on said support, means to rotate said print wheel, means to synchronize the operation of said first mentioned two means, locking mechanism controlled by said synchronizing means to prevent rotation of said print wheel at predetermined times, means to intermittently operate said moving means and said rotating means and means to vary the time interval between the operation of said rotating and moving means by said operating means.

4. In a measuring instrument having a chart, a carriage including a U-shaped member, means to support said carriage in a position adjacent said chart for movement laterally of the chart comprising a guide member and a shaft, a bearing in the U-shaped portion of said carriage, said bearing surrounding said shaft, a support tiltably carried by said carriage and mounted for tilting movement on said bearing, a print wheel and an ink pad therefor carried by said support, and means to tilt said support in said carriage around said bearing to bring said print wheel into contact with the chart.

5. In a measuring instrument, a carriage including a U-shaped member, means to support said carriage including a parallel support and shaft, a bearing in the U-shaped member and received by said shaft, means to move said carriage along said support and shaft to a position corresponding to the value of a measurable condition, a support mounted on said bearing for movement relative to said carriage whereby the support may move along the first support and shaft with the carriage and may move around the bearing relative to the carriage, a print wheel having a plurality of characters and an ink wheel having an ink pad for each character, both rotatably mounted on relatively stationary axes on said support, and means acting through said bearing to rotate said ink wheel and print wheel to bring said characters into engagement with said ink pads.

6. In a measuring instrument, a shaft, a bearing slidable along said shaft, a carriage including a U-shaped member having the sides of the U surrounding the ends of the bearing, a support movably mounted on said bearing between the sides of the U-shaped member, means located between said support and one side of said U-shaped member to maintain a constant tension aaginst movement of said support on said carriage, means to shift said carriage and bearing on said shaft, and means to move said support on said carriage.

7. In a measuring instrument adapted to sequentially record a plurality of values on a chart, recording means comprising a rotatable recording member, means operative to rotate said recording member including a toothed wheel, intermittently operated rotating means periodically operative to rotate said toothed wheel a predetermined amount, a cam member rotatable with said rotating means, a locking member acting to maintain said toothed wheel in a fixed position, said cam operating to hold said locking member in its operative position, said cam being positioned with respect to said rotating means so that the cam will release the locking means just prior to the time the toothed wheel is rotated.

8. In a measuring instrument having a print wheel and gearing for rotating same, the combination of means to rotate said gearing comprising a cam having a member attached thereto, means to intermittently rotate said cam and member, a toothed wheel engaged by said member as it rotates, said toothed wheel serving to drive the gearing, a locking member for said toothed wheel operated by said cam to normally prevent rotation of said toothed wheel and gearing, said cam and pin being so related to each other that the cam will release the lock just as the member rotates the toothed wheel.

9. A recording instrument having a chart adapted to receive records thereon, the combination of a print wheel carriage mounted for movement across the chart, a print wheel in said carriage, means to move said print wheel from a position in which it is out of engagement with the chart to a position in which it engages the chart including a cam follower operatively connected to said print wheel for movement therewith, means to bias said print wheel and cam follower for movement in a direction to bring said print wheel into engagement with said chart, a cam engaged by said cam follower serving at times to inhibit the movement of said cam follower, means to rotate said cam including a ratchet fastened to said cam, a pawl engaging said ratchet, an oscillating lever upon which said pawl is mounted, means to periodically oscillate said lever and means to vary the amount of oscillation imparted to said lever.

COLEMAN B. MOORE.